April 4, 1939. H. EUDY 2,152,883

TIRE

Filed Jan. 30, 1936

INVENTOR.
Harrison Eudy
BY
Roy, Oberlin & Ray
ATTORNEYS.

Patented Apr. 4, 1939

2,152,883

UNITED STATES PATENT OFFICE 2,152,883

TIRE

Harrison Eudy, Cleveland Heights, Ohio, assignor to The Paine & Williams Company, Cleveland, Ohio, a corporation of Ohio Application January 30, 1936, Serial No. 61,558

10 Claims. (Cl. 152—209)

This invention relates, as indicated, to tires for automotive vehicles and the like, but has reference more particularly to a tire having a slitted tread.

It has heretofore been proposed, as in the Sipe Patent No. 1,452,099, to provide a series of transverse cuts or incisions in a tire having an otherwise smooth continuous tread or wear surface, whereby improved gripping and tractive qualities are said to be obtained and the possibilities of skidding minimized. However, due to the continuity of the tread surface, the tread sections thus formed by the cuts or incisions are not isolated from each other, but are directly contiguous. Consequently, when any such tread section is radially compressed, as when it comes into engagement with the road surface, it will be resisted by the contiguous tread sections in its efforts to spread circumferentially of the tire, so that little opportunity is afforded for the slits to open up to permit the surfaces formed by the slits to come into effective use as surfaces which will provide the necessary gripping and tractive qualities.

Moreover, the slits, as described in such patent, extending as they do transversely of the tread surface of the tire, are more effective for improving the tractive qualities in a direction circumferentially of the tire, but are not as effective for improving the gripping qualities of the tire when the wheels of the vehicle are moving laterally or at an angle to the normal direction of movement of the vehicle, as in skidding.

It is a primary object of the present invention to overcome some or all of the aforesaid shortcomings of previously patented constructions, by providing a tire having slits or incisions which are so disposed with relation to the tread surface of the tire and of such character as to be highly effective for traction improving qualities under all conditions of use of the tire.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 1:
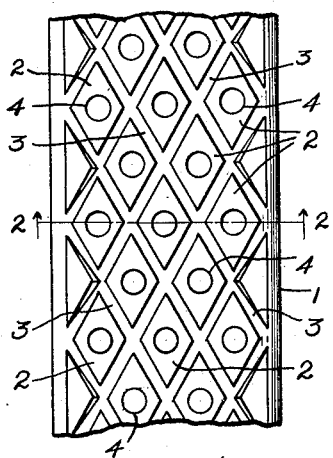
Figure 8:
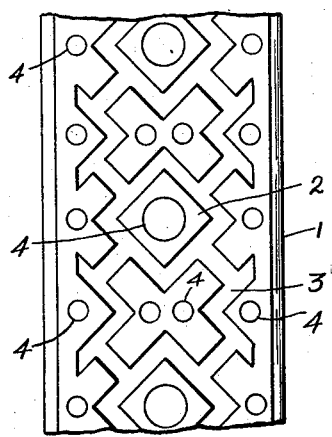
Figure 9:
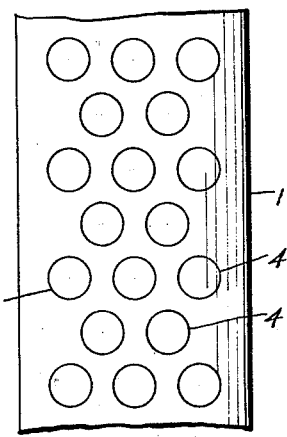
Figure 2:
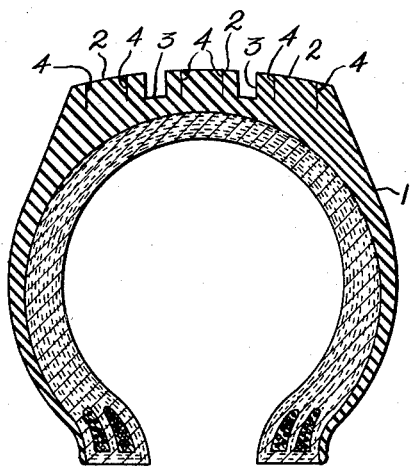
Figure 3:
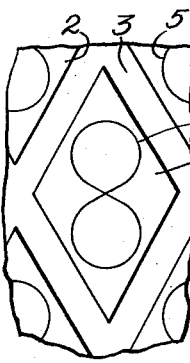

In said annexed drawing:

Fig. 1 is a fragmentary plan of the tread of a tire embodying the novel features of the invention; Fig. 2 is a transverse cross-sectional view of the tire, taken on the line 2—2 of Fig. 1; Figs. 3, 4, 5, 6 and 7 are views of a portion of the tread shown in Fig. 1, but showing modified forms of slits or incisions; Fig. 8 is a view, similar to Fig. 1, but showing a different tread design; and Fig. 9 is a view, similar to Fig. 1, of a portion of a smooth-tread tire.

In accordance with the invention, I provide a tire 1 having raised treads or lands 2, which are isolated or separated from each other by grooves or recesses 3 of substantial depth and width. These treads or lands 2 may assume any desired form or design as is common in the usual commercial forms of tires, but, if desired, they may be of larger area than is commonly found in such commercial forms of tires so as to present larger surfaces for contact with the ground thereby increasing the tractive properties of the tire.

I then form slits or incisions in the treads or lands 2, which extend radially inwardly from the ground-engaging or outer surfaces of the treads to the bottoms of such treads or to points intermediate the outer surfaces and bottoms.

These slits are of no appreciable width, so that in the unstressed condition of the tire, the slits would scarcely be visible, the treads appearing to be substantially smooth or uncut. The slits are preferably in the form of circles 4 as shown in Figs. 1, 2, 8 and 9, but may be made in other forms consisting of angularly related portions, as, for example, a figure 8 as shown at 5 in Fig. 3, the diamond 6 in Fig. 4, or the triangle 7 in Fig. 5, or intersecting angularly related slits 8, 9, which may terminate short of the edges of the treads, as shown in Fig. 6, or extend to such edges, as shown in Fig. 7, may be provided in the treads.

When the tire is stressed, as when power is applied to the wheels or when the car is skidding, the slits are opened up, the outer surfaces of the lands providing with the adjacent walls of the slits corners or sharp edges which engage uneven or irregular surfaces in the road and are therefore highly effective in increasing traction and reducing skidding. The slits, in effect, provide a number of edges or corners in the surface of the tire which are in addition to the corners or edges provided by the junctions of the lands 2 and grooves 3, and therefore augment the action of the latter in increasing traction and reducing skidding.

By forming the slits in the lands or raised portions of the treads, the resistance to the opening up of the slits is reduced by virtue of the fact that the portions of the lands surrounding the slits are not in contiguity with other lands, but are isolated or separated from each other by the grooves 3, being therefore free to yield or spread in the direction of such grooves when stressed or compressed, as when they come into engagement with the road surface. By thus enabling the slits to open up more readily, the tractive and skid-minimizing properties provided by the slits is increased.

Figure 6:
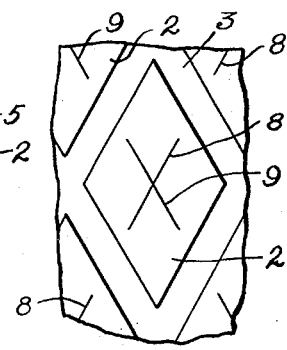
Figure 4:
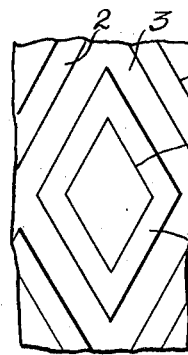
Figure 5:
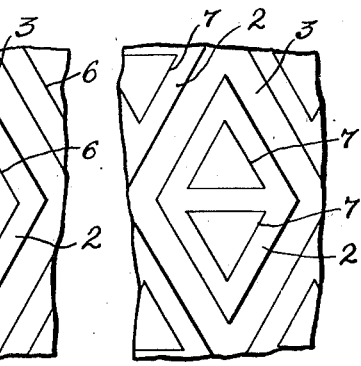
Figure 7:
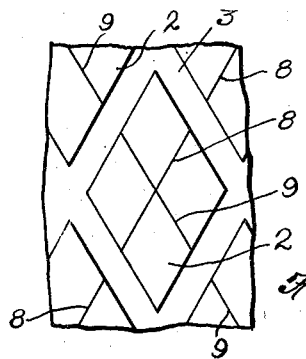

It will be understood that the term "slit" as herein employed, is intended to cover all of the forms of slits disclosed in Figs. 1, 2, 3, 4, 5, 8 and 9, and is also intended to cover each of the slits 8 and 9, shown in Figs. 6 and 7.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A pneumatic tire having tread portions isolated from each other circumferentially of the tire, said tread portions being provided with slits having contiguous or abutting walls when said tread portions are in normal unstressed condition.

2. A pneumatic tire having tread portions spaced circumferentially of the tire by grooves, said tread portions being provided with slits having contiguous or abutting walls when said tread portions are in normal unstressed condition.

3. A pneumatic tire having tread portions spaced circumferentially and laterally of the tire by grooves, said tread portions being provided with slits having contiguous or abutting walls when said tread portions are in normal unstressed condition.

4. A pneumatic tire having tread portions isolated from each other circumferentially and laterally of the tire, said tread portions being provided with slits having contiguous or abutting walls when said tread portions are in normal unstressed condition.

5. A pneumatic tire having circumferentially discontinuous tread portions, said tread portions being provided with slits having contiguous or abutting walls when said tread portions are in normal unstressed condition.

6. A pneumatic tire having circumferentially and laterally discontinuous tread portions, said tread portions being provided with slits having contiguous or abutting walls when said tread portions are in normal unstressed condition.

7. A pneumatic tire having spaced tread portions, said tread portions being provided with slits which terminate short of the boundaries of said tread portion, each of said slits having contiguous or abutting walls when said tread portions are in normal unstressed condition.

8. A tire having a plurality of spaced raised tread portions, each of which is provided with a circular slit, each of said slits having contiguous or abutting walls when said tread portions are in normal unstressed condition.

9. A tread member having spaced tread portions, said tread portions being provided with slits, each of which has contiguous or abutting walls when said tread portions are in normal unstressed condition, and no portion of which extends to the boundaries of said tread portions.

10. A pneumatic tire having tread portions spaced circumferentially of the tire by grooves, said tread portions being provided with slits, each of which has contiguous or abutting walls when said tread portions are in normal unstressed condition, and no portion of which extends to said grooves.

HARRISON EUDY.